United States Patent

Asprey et al.

[11] Patent Number: 5,268,676
[45] Date of Patent: Dec. 7, 1993

[54] COMPUTER-MONITOR EXTENDED RANGE COMMUNICATIONS LINK

[75] Inventors: Robert R. Asprey, Harvest; Remigius G. Shatas, Huntsville, both of Ala.

[73] Assignee: Cybex Corporation, Huntsville, Ala.

[21] Appl. No.: 488,710

[22] Filed: Mar. 5, 1990

Related U.S. Application Data

[63] Continuation-in-part of Ser. No. 447,010, Dec. 5, 1989, Pat. No. 5,193,200, which is a continuation-in-part of Ser. No. 95,140, Sep. 11, 1987, Pat. No. 4,885,718.

[51] Int. Cl.[5] ............................................. G09G 1/00
[52] U.S. Cl. ........................................................ 345/2
[58] Field of Search ........... 340/717, 720, 825, 825.06, 340/825.29; 370/6, 7; 375/36, 3, 4, 60, 71; 358/86

[56] References Cited

U.S. PATENT DOCUMENTS

| | | |
|---|---|---|
| 3,657,478 | 4/1972 | Andrews, Jr. . |
| 3,691,295 | 9/1972 | Fisk . |
| 3,858,010 | 12/1974 | Higashide . |
| 3,925,776 | 12/1975 | Swallows ............................ 340/717 |
| 3,955,188 | 5/1976 | Viswanathan ...................... 340/717 |
| 4,303,896 | 12/1981 | Slabinski . |
| 4,476,543 | 10/1984 | Quinones et al. . |
| 4,520,356 | 5/1985 | O'Keefe et al. .................... 340/717 |
| 4,622,551 | 11/1986 | Kupersmith et al. . |
| 4,630,284 | 12/1986 | Cooperman . |
| 4,665,501 | 5/1987 | Saldin et al. . |
| 4,785,467 | 11/1988 | Yamada . |
| 5,111,190 | 5/1992 | Zenda ................................. 340/717 |

Primary Examiner—Jeffery Brier
Attorney, Agent, or Firm—Phillips & Beumer

[57] ABSTRACT

A communications link up to about 300 feet for use between a computer and display unit receives analog R, G, and B signals from the computer and applies them to discrete current amplifiers that modulate signal current applied to discrete conductors of a 300 foot cable. Impedance matching networks match the R, G, and B signals to the characteristic impedance to the cable. The R, G, and B signals are received near the monitor, and coupled to discrete emitter-follower transistors, which amplify current of the signals prior to inputting the signals to the monitor. The horizontal sync signal is applied to a conductor of the cable without impedance matching, allowing the conductor to attenuate the horizontal sync signal and reduce noise radiation.

12 Claims, 6 Drawing Sheets

COMPUTER-MONITOR EXTENDED RANGE COMMUNICATIONS LINK

CROSS REFERENCE OF RELATED APPLICATION

This application is a continuation-in-part of application Ser. No. 07/447,010, filed Dec. 5, 1989, now U.S. Pat. No. 5,193,200 which is a continuation-in-part of application Ser. No. 07/095,140, filed Sep. 11, 1987, now U.S. Pat. No. 4,885,718.

FIELD OF THE INVENTION

This invention relates generally to the coupling of signals between a computer and a keyboard and display unit, or K.D.U., and particularly to a communications link which enables the K.D.U. to be located at extended distances from the computer. In this case, the terminal contains either a monochrome or a color monitor driven by either TTL, composite monitor, or discrete analog video signal levels.

BACKGROUND OF THE INVENTION

It is a convenient practice to physically separate a digital computer from the keyboard and display unit by which the computer is monitored and controlled. Actually the K.D.U. consists of two units, a cathode ray-type display and a keyboard. The cathode ray display or, as it is usually called, a monitor, and keyboard may be in the form of a single housed unit or, as more commonly today with microcomputers, the monitor and keyboard are separate. The most popular microcomputer presently in use is the IBM-PC microcomputer, and there are many units made by other manufacturers which generally employ the same or a similar arrangement for interconnecting a keyboard and monitor to a computer.

As a matter of convenience, there are separate electrical jacks on these computers for mating plugs, one plug connecting to a monitor cable and the other to a keyboard cable. The opposite ends of these cables have plugs which directly plug into a monitor equipped jack and a keyboard equipped jack. Normally these cables are on the order of four to six feet in length, enabling some, but limited, separation of a monitor-keyboard work station from a computer. This typically requires that the computer and work station be generally located together.

It is to be appreciated, however, that there are situations, in fact, many, where it is desirable to separate the computer and a work station. This may be by virtue of space limitations or because of environmental considerations, the latter sometimes including an inhospitable environment for a computer.

Separation has been attempted by extending the length of the separate connecting cables described above, but it has been found that where the separation is greater than, say, 12-16 feet, reliability is sacrificed. If a single cable housing both monitor and keyboard leads is attempted, as would be the ideal approach for greater distances, signal interaction becomes intolerable. Although it is believed many have attempted to solve the problems involved as they have been present for several years, insofar as applicants are aware, they have not succeeded and that no dual cable linkage system has been successfully employed beyond the 12-16 foot range, and no successful single ended TTL cable system has been accomplished other than by the applicants.

The applicants, and, it is believed, others, attempted to employ standard filtering techniques, as by adding capacitance between certain signal lines and ground. This simply does not work, and it appears that others simply gave up.

It is the object of this invention to provide an improved communications link by which a relatively long, single cable connects a computer with a keyboard and display unit and yet provides error-free communications.

SUMMARY OF THE INVENTION

In accordance with this invention, a single, elongated as needed, multi-conductor cable interconnects two discrete circuit assemblies, one being located near a computer and interconnected by separate cables to the keyboard and monitor terminals of the computer and the other circuit assembly, at an opposite end of the cable, being separately interconnected to a keyboard and monitor.

The first circuit assembly employs discrete capacitors connecting between keyboard data and clock lines and a positive supply terminal. In addition, a TTL buffer amplifier is employed in each of the horizontal sync, vertical sync, video, and intensity signal lines. In addition, the signal inputs to the video and intensity buffer amplifiers are fed through small value current limiting resistors.

The second circuit assembly employs discrete resistors from the clock and data lines and positive supply terminal, and a third and lower value resistor is connected between the vertical sync lead and logic ground. Further, capacitance is added between a positive supply terminal and logic ground.

In another embodiment of this invention, a single, elongated as needed, up to on the order of 150 feet for color video signals or 300 feet for monochrome video signals, multi-conductor cable interconnects two discrete signal conditioning circuit assemblies, one being located near a computer and interconnected to at least monitor terminals of the computer and the other signal conditioning assembly, at an opposite end of the cable, being separately interconnected to at least a monitor.

The first signal conditioning assembly employs a TTL buffer amplifier in each of the horizontal sync, vertical sync, primary RGB and secondary rgb signal lines. In addition, signal outputs from the buffer amplifiers are highly attenuated prior to being passed over the long cable to prevent them from inducing interference into adjacent conductors.

The second signal conditioning assembly employs termination circuit means to stabilize each of the video signals prior to inputting them into respective buffer amplifiers which amplify the signal prior to it being input to an RC network following each of the buffer amplifiers. These networks again attenuate the signal to reduce or eliminate the high frequency component therein which radiates EMF.

In yet a third embodiment of this invention, a single, multiconductor cable up to 300 feet long interconnects two signal conditioning assemblies, one disposed to receive analog video signals from the computer and apply them to the cable, and the other disposed to receive the signals from the cable and condition them prior to inputting them to a keyboard and monitor adapted to receive discrete analog video signals.

The first analog signal conditioning circuitry utilizes, for the analog R, G, and B signals, a discrete current amplifier for each of the R, G, and B signals to modulate signal current flow through respective conductors of the cable to which the signals are applied. A following impedance matching network matches impedance of the signal to conductors of the cable. At the second analog signal conditioning network, power is coupled to the signal line via a selected resistance, which provides current to be modulated to the current amplifiers of the first analog signal conditioning circuitry. This modulated current provides a signal to a current amplifier in the second analog signal conditioning circuitry, which in turn provides this signal to the monitor.

The horizontal sync signal, having fast rise and fall times, is more prone to cause noise and is therefore applied to the conductor of the cable in the form of a voltage signal, with the conductor providing attenuation necessary to eliminate RF causing components of the signal. This is done in the first analog signal conditioning circuitry by applying the HS signal to a first voltage divider, which reduces amplitude of the signal, after which the reduced HS signal is applied to a first switching device that switches at approximately 700 MV threshold, generating a current flow from power to ground. The potential of this current flow is applied to the conductor of the cable. As stated, the cable attenuates this signal, eliminating RF components thereof, and conveys the attenuated signal to the second analog signal conditioning circuitry where it is reduced by a second voltage divider. This reduced signal is applied to a second switching device that switches at approximately 700 MV which likewise generates a current flow from power to ground, with the potentials generated thereby being applied to the HS input of the monitor.

DETAILED DESCRIPTION OF THE DRAWINGS

Figure 1:
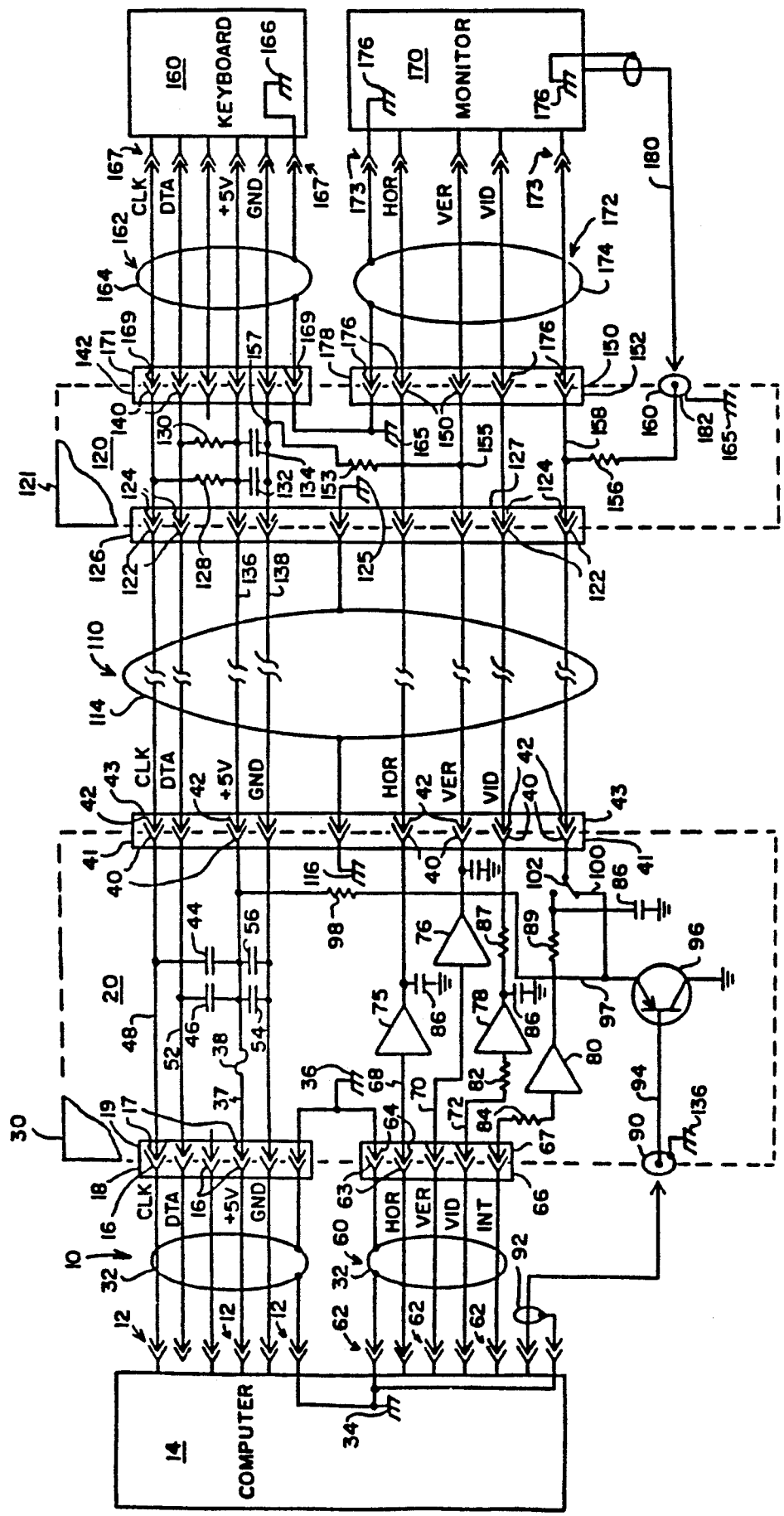
FIG. 1 is a schematic diagram of an embodiment of the invention where signal coupling is to a terminal combination employing a monochrome cathode ray display.

Referring to FIG. 1, a shielded cable 10 for a monochrome monitor is connected from keyboard input connector terminals 12 of computer 14 to receptacle terminals 16 housed in receptacle assembly 18. Receptacles 16 connect to plug terminals 17 of plug assembly 19 of signal conditioning circuit 20. Circuit 20 is located in housing 30 and, as labeled, connections to it are clock (CLK), data (DTA), +5 volts (+5 V) and logic ground (GND). Cable shield or sheath 32 of metal is connected to both chassis ground 34 of computer 14 and chassis ground 36 of housing 30. A +5-volt input is coupled from connector terminals 12 from computer 14 via receptacle 16 and plug 17 to lead 37 through fuse 38 to receptacle 40 of receptacle assembly 41. Receptacle 40 is coupled to plug 42 of plug assembly 43, which in turn couples the +5 v. to shielded cable 110. The clock, data, and logic ground leads are similarly connected between like labeled connector terminals 12 to receptacles 16 and plugs 17, which are directly connected to receptacles 40 and plugs 42. Significantly, it has been discovered that interference between the video lines and clock and data lines is substantially reduced by employment of capacitors 44 and 46, capacitor 44 being connected from clock lead 48 to the +5-volt lead 37 and capacitor 46 connected from data lead 52 to +5-volt lead 37. Capacitor 44 has a value of approximately 0.002 mfd, and capacitor 46 has a value of up to approximately 0.006 mfd. In addition, a relatively large capacitor 54, for example, 22 mf, is connected between +5-volt lead 37 and logic ground; and a smaller capacitor 56, for example, 0.1 mf, is also connected between these points. By this means, high frequency noise is shunted to ground via the smaller, faster-acting capacitor. The larger and slower-acting one is used to stabilize the +5-v. D.C. supply.

A second shielded cable 60 is connected from monitor output connector terminals 62 of computer 14 to functionally labeled receptacle terminals 63 mounted in receptacle assembly 66 and which connect to plug terminals 64 mounted in plug assembly 67 of signal conditioning circuit 20. As labeled, the monitor terminals are horizontal sync (HOR), vertical sync (VER), video (VID), and intensity (INT). Cable shield 32 is connected to chassis ground 34 of computer 14 and chassis ground 36 of circuit 20. Each of monitor leads 68, 70, 72, and 74 feed the input of a discrete TTL logic buffer amplifier (which switches high and low responsive to discrete high and low signal inputs) of amplifiers 75, 76, 78, and 80. The video input to amplifier 78 and intensity input to amplifier 80 are each fed through small, for example, 20 ohms, current limiting resistors, being resistors 82 and 84. These resistors effect a reduction in switching speed for the amplifiers to reduce output high frequency noise radiation. Each of the monitor signal leads, at the output of the amplifiers, is conventionally connected to ground through 22 pf (approximate) capacitors 86 as a means of reducing stray radiation, and there are small value, e.g., 33 ohms, resistors 87 and 89 in series with the outputs of amplifiers 78 and 80, respectively.

The outputs of amplifiers 75, 76, and 78 are connected to appropriately labeled signal outputs of receptacle terminals 40 of receptacle assembly 41.

A separate RCA-type jack 90 is mounted on housing 30 and is adapted to receive an RCA plug which feeds via a separate shielded cable 92 from a computer, e.g., computer 14, a composite video signal. A lead 94 from jack 90 is connected to the base input of a grounded collector transistor amplifier 96. It is powered through its emitter, being connected by lead 97 through resistor 98 to +5 volt lead 37 and a signal lead 100 connects the emitter to one terminal of selector switch 102. A second input to this switch is connected to the output of intensity amplifier 80. Thus, switch 102 provides on an output terminal of terminals 40, a video intensity signal, or an amplified composite video signal as desired.

A single, shielded, multi-conductor cable 110 has plug terminals 42 plugged into receptacles 40 of circuit 20. Its shield 114 is connected to chassis ground 116, and other leads are connected as labeled. Cable 110 thus includes all leads for both keyboard and monitor, and it may be made for extended range, for example, 50 to 150 feet or greater, terminating at a second signal conditioning circuit 120 where its receptacle terminals 122, mounted in receptacle assembly 126, mate with plug terminals 124, which are mounted in plug assembly 127.

Signal conditioning circuit 120 is mounted within housing 121, and like labeled leads of cable 110 are connected to like functions clock, data, +5-volt logic ground, vertical sync, horizontal sync, video, and intensity plug terminals 124. Shield 114 connects to chassis ground 125. Clock and data leads of the keyboard circuit are connected to +5 volts through resistors 128 and 130, each being closely approximate to 1,000 ohms. This serves to provide additional power to assist the keyboard (160) in raising the clock and/or data line voltage. Capacitor 132, for example, 22 mf, and a smaller capacitor 134, for example, 0.1 mf, are connected between +5 volts lead 136 and logic lead ground 138. The keyboard leads directly interconnect between plug terminals 124 of plug assembly 127 and like function receptacle terminals 140 mounted in receptacle assembly 142. The monitor related leads are directly connected between plug terminals 124 of plug assembly 127 and a discrete one of receptacle terminals 150 mounted in receptacle assembly 152, input and output leads functionality being maintained. A resistor 153, for example, 150 ohms, is connected between vertical sync terminal 155 and a logic ground terminal 157.

A small resistor 156, for example, 68 ohms, is connected between lead 158 and an output jack, for example, an RCATM jack 160, the outer shield portion of which is connected to ground. This jack provides an output for composite video when switch 102 of circuit 20 is switched to a lower position.

Keyboard 160 is coupled to signal conditioning circuit 120 via a shielded cable 162 having an enclosing shield 164 connected between conditioning circuit ground 165 and keyboard ground 166. The leads of this cable extend from keyboard receptacle terminals 167 and, as functionally labeled, terminate in plug terminals 169 mounted in plug assembly 171. These leads are plugged into receptacles 140 of signal conditioning circuit 120. This thus completes a keyboard circuit between keyboard 160 and computer 14.

Monochrome monitor 170 is similarly connected to signal conditioning circuit 120 via a shielded cable 172 connecting from receptacle terminals 173 of monitor 170 to signal conditioning circuit 120. Shield 174 of cable 172 is connected to chassis ground 176 of monitor 170 and to chassis ground 165 of signal conditioning circuit 120. The function of each of the leads of cable 172 is labeled, and each lead connects to a plug terminal 176 mounted in a plug assembly 178 which plugs into a receptacle assembly 152 having receptacles 150 connected to signal conditioning circuit 120. In addition, single lead shielded cable 180 provides an optional composite of video input to monitor 170, this cable being pluggable into receptacle 182. By the connection of monitor 170 to signal conditioning circuit 120, a circuit is completed between computer 14 and monitor 170.

By virtue of the combination of the two signal conditioning circuits described, shielded cable 110 enables a computer and terminal, or work station, to be widely separated. Tests thus far have shown that this distance can be up to 300 feet and probably may be longer. Interaction between monitor and keyboard circuits have been conditioned by the unique arrangement illustrated in a manner which provides adequate signal levels for communication and at the same time reduces interaction between circuitry elements to a point which enables error-free communications between a keyboard and computer and between a computer and monitor.

Figure 2:
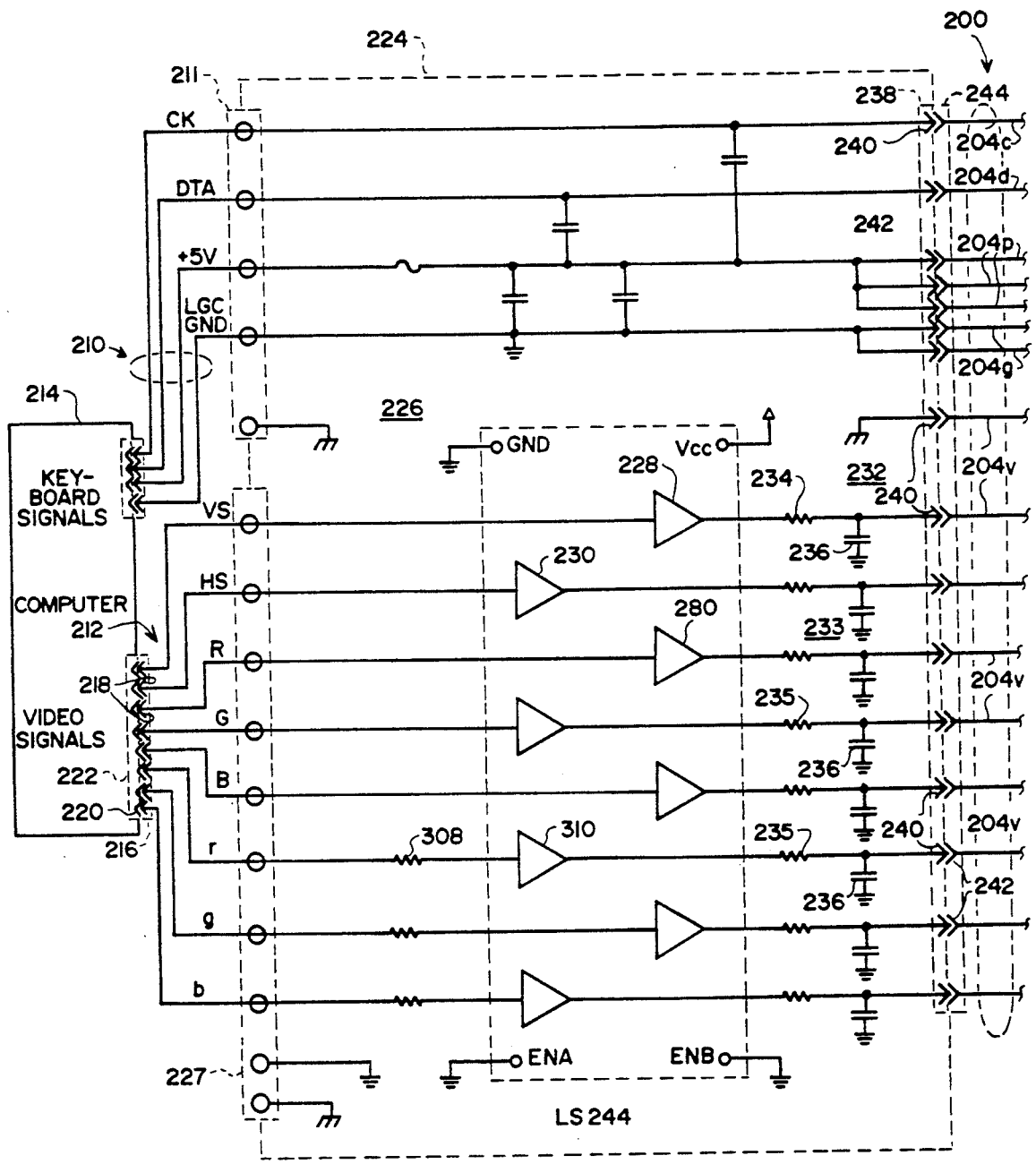
FIG. 2 is a portion of a schematic diagram of another embodiment thereof wherein coupling circuitry is disclosed for coupling a computer to a remotely located color or monochrome K.D.U.
Figure 3:
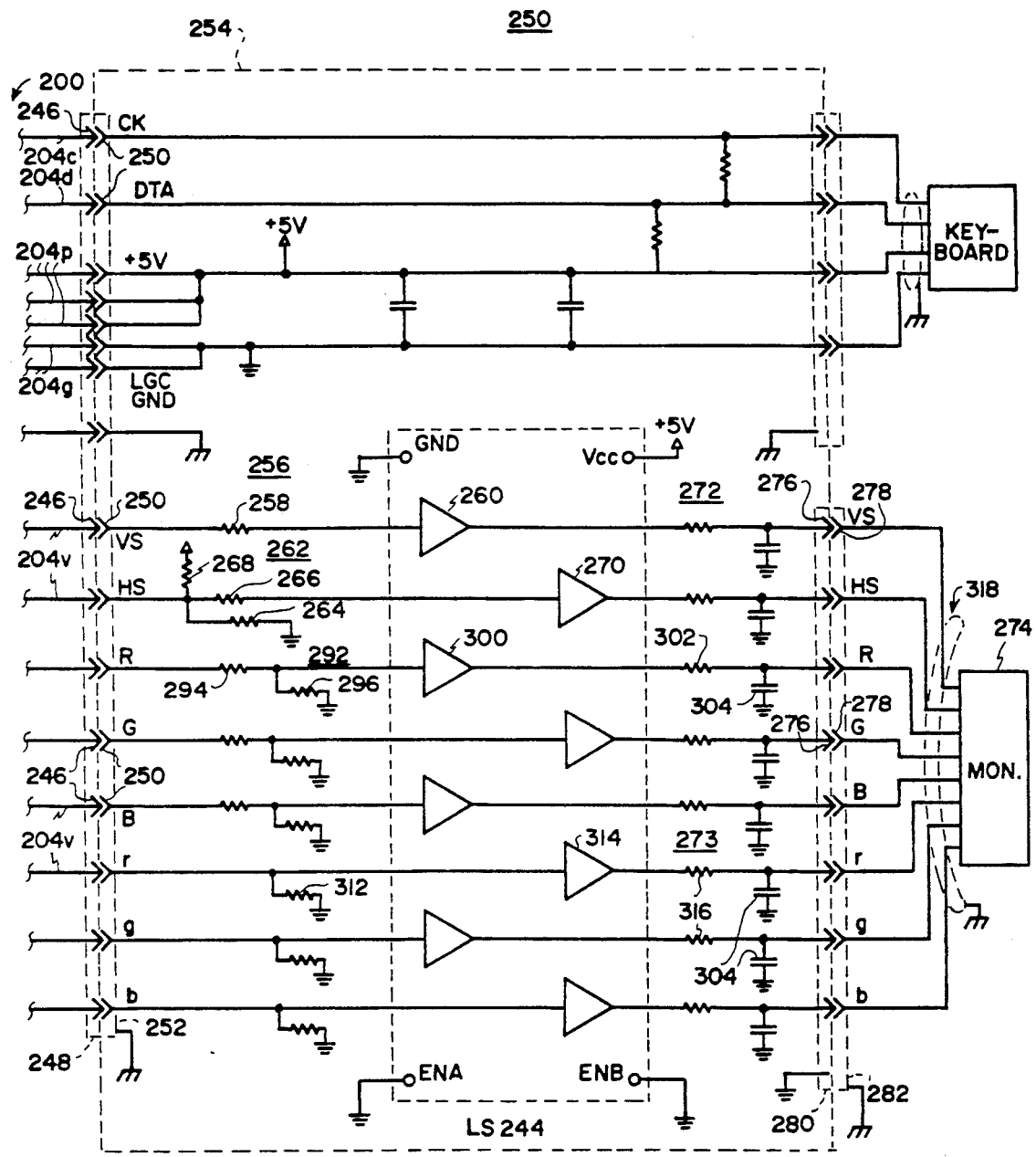
FIG. 3 is a continuation of that portion shown in FIG. 2.

In the instance where digital color monitors are being used in a K.D.U. (keyboard display unit), FIGS. 2 and 3 illustrate an extended range cable 200 and associated signal conditioning circuitry at each end thereof that is capable of extending the color K.D.U. a distance of up to 150 feet from the computer. It is to be noted that this particular circuitry is also capable of extended monochrome transmissions of up to distances of 300 feet. It is to be further noted that in the instance where a monitor is to be used as a stand-alone component, such as in an inhospitable environment where it is desired only to provide a computer display, external +5-volt power would be provided to the signal conditioning circuitry via the keyboard power connection from the computer, with clock and data lines left unconnected.

Figure 5:
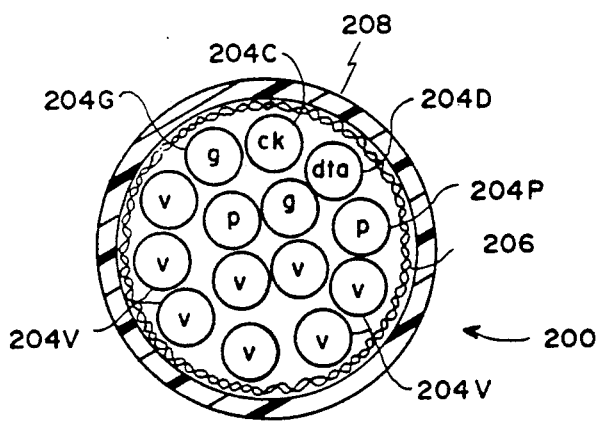
FIG. 5 is an illustration of a particular method for shielding keyboard clock and data signal lines from adjacent video signal lines in a cable.

When a keyboard is used, FIG. 5 illustrates a novel method for shielding keyboard clock and data signals from adjacent video carrying conductors. Cable 200 is a conventional cable constructed of multiple, insulated conductors 204 which maintain their relative position over the length of cable 200, and which is less expensive than conventional twisted pair cables used by most manufacturers, with cable 200 being shielded from electromagnetic interference by braided and foil shields 206 disposed around conductors 204. A flexible, insulative cover 208 in turn covers and protects shield 206 and conductors 204. Applicants have discovered that by applying keyboard clock and data signals to adjacent conductors 204c and 204d and then applying keyboard +5 volt power and ground potentials as shown to interposing conductors 204p and 204g, that the interposed conductors 204p and 204g effectively shields radiation from keyboard clock and data signals from color video information applied to conductors 204v.

With keyboard circuitry remaining as described above in a separate cable 210 from computer 214 (FIGS. 2 and 3), a shielded cable 212 (shield not shown for convenience) for carrying video signals is coupled from computer 214 by plug 216 having terminals 218 connected to terminals 220 of receptacle 222. Receptacle 222 (dashed lines) is supported by computer 214, with terminals 220 connecting to signal conditioning circuitry 226 housed in enclosure 224 via cable termination pad 227. Keyboard signals, when used, are routed to respective conditioning circuitry via termination pad 211. As described, receptacle 222 provides connections via terminals 218 and 220 for vertical sync signals (VS), horizontal sync signals (HS), and primary and secondary color video signals which include primary Red, Green, Blue, designated by R, G, and B, and secondary red, green, blue, designated r, g, and b, chassis ground and logic ground. These color video signals are used in at least two common color monitor systems, the color graphics adapter (CGA) system and enhanced graphics adapter (EGA) system. In the CGA system, the primary R, G, and B lines carry color video information, with the secondary g line carrying an intensity signal. Typically, in this system, the primary R, G, and B lines carry varying, independently discrete color signals, while the intensity signal on g fluctuates between high and low states and acts upon color guns turned "on" to vary their intensity simultaneously, making possible 16 different colors.

In the EGA system, on the other hand, and in addition to the primary R, G, and B signals, secondary r and b signals are provided in addition to the g signal, all of which may be varied independently from one another and additionally may be turned on independent from the primary R, G, and B signals, making possible 64 different colors.

Dealing first with sync signals, it is seen that the terminals 220 labelled VS and HS of cable 212 couple vertical and horizontal sync signals VS and HS to respective TTL buffer amplifiers 228 and 230. Amplifiers 228 and 230 accept varying quality signals from various types of monitors and serve to make these signals compatible with applicants' TTL transmission scheme. After being amplified, the sync signals VS and HS are passed through discrete RC networks 232 consisting of a series resistor 234 having a value of approximately 68 ohms and being coupled to a capacitor 236 connected to ground having a value of between 330 picofarads and 680 picofarads, with 470 picofarads being preferred. This capacitance range is maintained for all of RC networks 232 and 233, with the larger resistance of 68 ohms used because of the slower frequency of sync signals as opposed to faster video signals. The corresponding RC networks 233 which attenuate the faster video signals use a smaller resistor, 20 ohms. These RC network effects interference reduction by attenuating the high frequency components of the signal in order to reduce electromagnetic interference. Applicants have found that these high frequency components are not necessary to digitally transmit color or monochrome video signals over long cable runs, as will be described. Sync signals VS and HS are then output to a receptacle 238 housing terminals 240 coupled to terminals 242 in plug receptacle 244 and being connected to conductors 204v of cable 200. Cable 200, as stated, may be as long as 150 feet for a color K.D.U. or up to 300 feet for a monochrome unit.

At the K.D.U. end 251 of cable 200 (FIG. 3), the sync signals VS and HS are coupled via terminals 246 of plug 248 through receptacle terminals 250, with receptacle 252 supported by a second enclosure 254 (dotted lines) to a second signal conditioning circuit 256 housed in enclosure 254. The VS signal, being approximately 60 Hertz, is simply passed through a 1K ohm series resistor 258 which limits current to the following buffer amplifier 260. The HS signal, having a frequency in the low to mid KHz range, typically between 10-30 KHz for most digital monitors, is passed through a termination network 262 consisting of a 1K ohm parallel-to-ground resistor 264 and a series coupled 510 ohm resistor 266. In some instances where certain types of K.D.U.s are used with long cable lengths, it is necessary to include a 1K pull-up resistor 268 coupled to +5 volts to stabilize the pulses and prevent time shift of sync pulses caused by crosstalk superimposed thereon.

After signals VS and HS are passed by the 1K resistor 258 and through termination network 262, they are input to TTL buffer amplifiers 260 and 270. These amplifiers are Schmitt triggered with a 400 mv hysteresis deadband, an example of which being the 74LS 244 integrated circuit, and which serve to amplify the sync signals and produce clean, fast VS and HS transitions from the attenuated VS and HS signals. This process brings signal levels up to TTL compatible levels of the monitor and eliminates noise accumulated over the long cable run. After being amplified, the signals are again attenuated by being passed through RC networks 272. As before, these networks serve as roll-off filters to limit EMI radiation by eliminating high frequency components of the signal prior to being input to color monitor 274 via terminals 276 and 278 of receptacle 280 and plus 282, respectively. As with receptacle 252, receptacle 280 is supported by enclosure 254.

Figure 4:
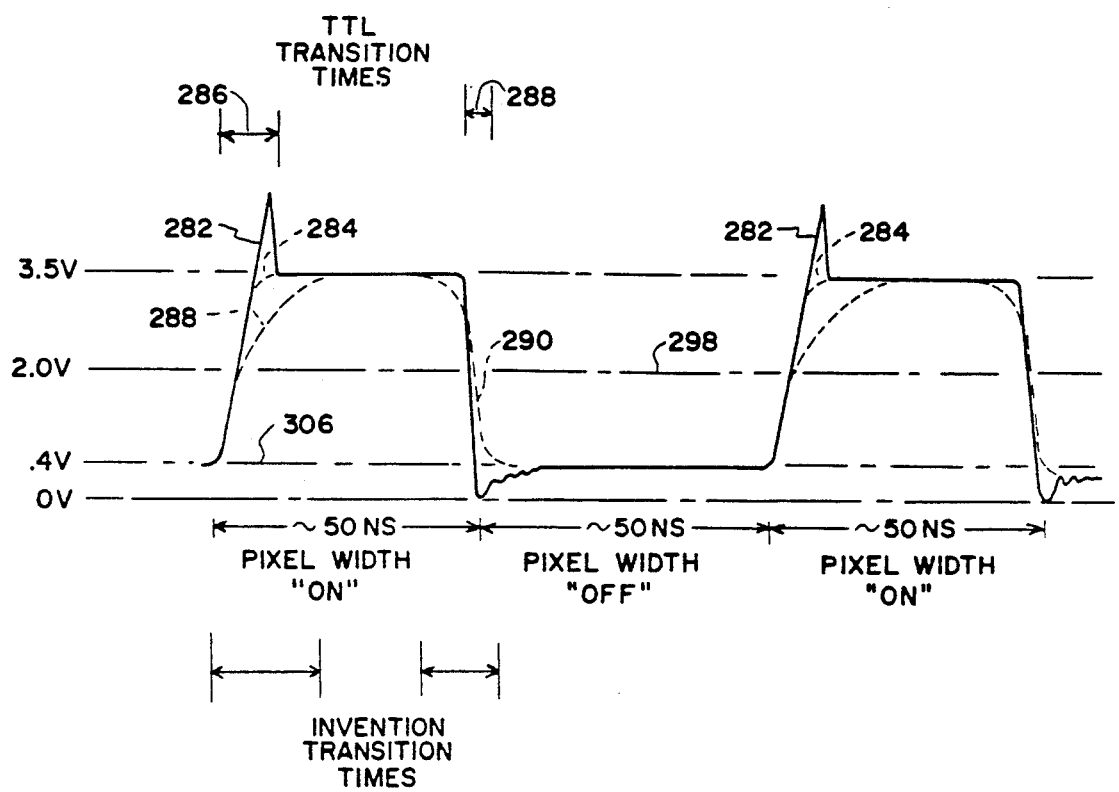
FIG. 4 is a waveform of pixel width or frequency, showing typical TTL video signals contrasted with applicants' signals.

Treatment of the primary R, G, and B signals will be undertaken next. These three signals control red, green, and blue color guns of the monitor and are treated in like manner en route from computer to K.D.U. Examining the primary red signal route, it being representative of the green and blue signal routes, it is seen that it is simply input via terminals 218 and 220 to computer video output cable 212, and designated R, to a TTL buffer amplifier 280 in an open ended configuration, meaning that only one wire is needed to transmit the red video information from amplifier 280. This is contrasted with the prior art which generally utilizes differential line drivers which require two wires per signal. Significantly, and referring to FIG. 4, since TTL signals are prone to cause induced noise in adjacent conductors due to their fast rise and fall times, typically in the low nanosecond range between 5-15 nanoseconds, applicants have found that by increasing capacitance of the standard RC networks 232 and 233 following buffer amplifier 280 by a factor of approximately 10, to 470 pf, they can attenuate that portion of the transmitted video signal which is greater than the dot-clock frequency (or pixel rate) of the monitor. This frequency varies between different manufacturers of monitors and is generally in the 10-30 MHz range. FIG. 4 illustrates the worse case frequency for an 18 MHz monitor having a pixel frequency of approximately 50 nanoseconds, this situation being when such a signal is transmitted by computer 214 to trigger "on" every other pixel in the monitor display. As shown, the normally sharp rising and falling edges of the standard TTL signal normally used for color monitors, and which is responsible for the greatest portion of interfering radiation, contains an overshoot region 282 inherent in most TTL switching devices. This is clipped by attenuation networks of the prior art to form a signal shown by dashed lines 284. However, this still results in a signal having a fast TTL rise time 286 and an even shorter fall time 288 which, while being desirable in digital circuitry, radiates EMI at frequencies determined by the rise and fall time. Of course, with an RC network having a fixed capacitance, the higher the pixel frequency, the more attenuation is achieved. In applicants' circuitry, the capacitance thereof is selected to provide minimal attenuation at 10 MHz, 50 percent attenuation at 20 MHz, and 70 percent attenuation at 30 MHz. Thus, applicants' video signals are provided with slow rise and fall times 288 and 290, respectively (dotted lines), which have been shown to drastically reduce high frequency components of radiated EMI. In other words, the rise time of the signal from buffer 280 is spread out by network 233 over a time period far longer than what is considered acceptable for use with TTL logic components. Because of this, some phase shifting occurs due to the highly attenuated signal, but because the signal ultimately is displayed on a monitor and the shifts are in the nanosecond range, they are undetectable to the eye. This technique, in addition to reducing EMI by eliminating high frequency components of the signals, allows applicants to transmit color digital intelligence over long, adjacent conductors without significant interference, or crosstalk, therebetween.

After being amplified and attenuated as described by amplifier 280 and RC network 233 (FIG. 3), the primary Red signal (R) is coupled as described to a single conductor 204v of 150-foot cable 200 and coupled as described to signal conditioning circuitry 256. Here, the primary Red signal first passes through a termination network 292 consisting of a series connected 33 ohm resistor 294 and a parallel-to-ground 150 ohm resistor 296. This network serves to limit overshoot of the signal and provides some current drain to eliminate any crosstalk that occurs over the 150 feet of conductor 204v. At this point, the discrete digital signals have a peak potential of between 3.0 and 3.5 volts, well above the 2.0-volt threshold 298 (FIG. 4) necessary to trigger "on" the following amplifier 300, which is also a Schmitt triggered buffer amplifier having a 400 millivolt hysteresis deadband (74LS 244).

Upon examining FIG. 4 at this point, it will become apparent that as applicants' video signal, substantially shown in dotted lines, and as received by signal conditioning circuitry 256, will have been phase shifted only a small amount in comparison to the total pixel width of approximately 50 nanoseconds, probably less than 10 nanoseconds from the standard TTL signal at the point where it crosses threshold 298, triggering "on" amplifier 300. At this point, the attenuated signal shown in dotted lines will reproduce a phase shifted TT1 signal as shown which is shifted by 10 nanoseconds or less. To reduce EMI radiation of this reconstructed signal, applicants degrade the high frequency portion thereof. Buffer 300 amplifies the signal to a voltage level of approximately 3.5 volts, cleaning up the signal and buffering monitor termination network 274. After being amplified, the signal is fed to one of RC networks 272 consisting of a series connected 33 ohm resistor 302 and a coupled-to-ground connected capacitor 304. The capacitance of capacitor 304 is selected to be between 47 and 560 picofarads, with 470 picofarads being typical. The lower range of capacitance with respect to attenuation networks 232 and 233 is due to the shorter cable 318 coupled to monitor 274. This network again reduces the EMI radiation by clipping the high frequency components of the signal as described. The phase shift 306 (FIG. 4) caused by attenuation network 304 (FIG. 2) is cumulative with the same phase shift from attenuation networks 232 and 233 (FIG. 3). However, as described, phase shift errors induced thereby on discrete pixels may be ignored because they cannot be detected by the eye when displayed on a monitor.

Treatment of the secondary rgb video signals will now be undertaken. Inasmuch as they are treated the same with respect to each other, slight differences exist between treatment in general between primary and secondary color video signals. Examining first the secondary red (r) video signal, it being representative of the green and blue secondary signal routes, it is input to signal conditioning network 226 from the computer at terminal 218, designated r, of receptacle 222. Thereafter, the secondary red signal, being a weaker signal than the primary R signal, is passed through a 100-ohm resistor 308 which serves to attenuate the square wave signal to avoid high frequency induced crosstalk. Next, the secondary red signal is input to a TTL buffer amplifier 310 coupled in open ended configuration for reasons described, which amplifies the signal prior to passing it to one of RC networks 232. Network 232 is a like network to that described for the primary Red signal and used for the same purpose, i.e., EMI reduction and signal attenuation. The signal then passes to terminals 240 and 242 of plug 238 and receptacle 244 and thereafter to the 150-foot conductor 204v in cable 200. After passing through terminals 246 and 250 of plug 248 and receptacle 252 at the K.D.U. end (FIG. 3), the secondary red signal is terminated by 100 ohm termination resistor 312, which eliminates induced crosstalk superimposed on the signal by providing a slight current drain. The signal is then input to the integrated circuit containing another Schmitt trigger buffer amplifier (74LS 244) 314 which again buffers the termination networks of monitor 274. After being amplified, the secondary red signal is passed through one of RC networks 273 utilizing a 20 ohm resistor 316, with network 273 used as described for the primary red signal for the same purpose, i.e., EMI reduction and clipping of the high frequency component of the secondary rgb signals. It should be noted, however, that selection of 470 picofarad capacitance for capacitors 314 is not as critical as is the selection of capacitance of capacitor 236 of networks 233 due to the shorter cable length of cable 318 from monitor 274 connecting plug 282 to receptacle 280. As stated, these capacitors may have values that range from 47 to 560 picofarads.

Figure 6:
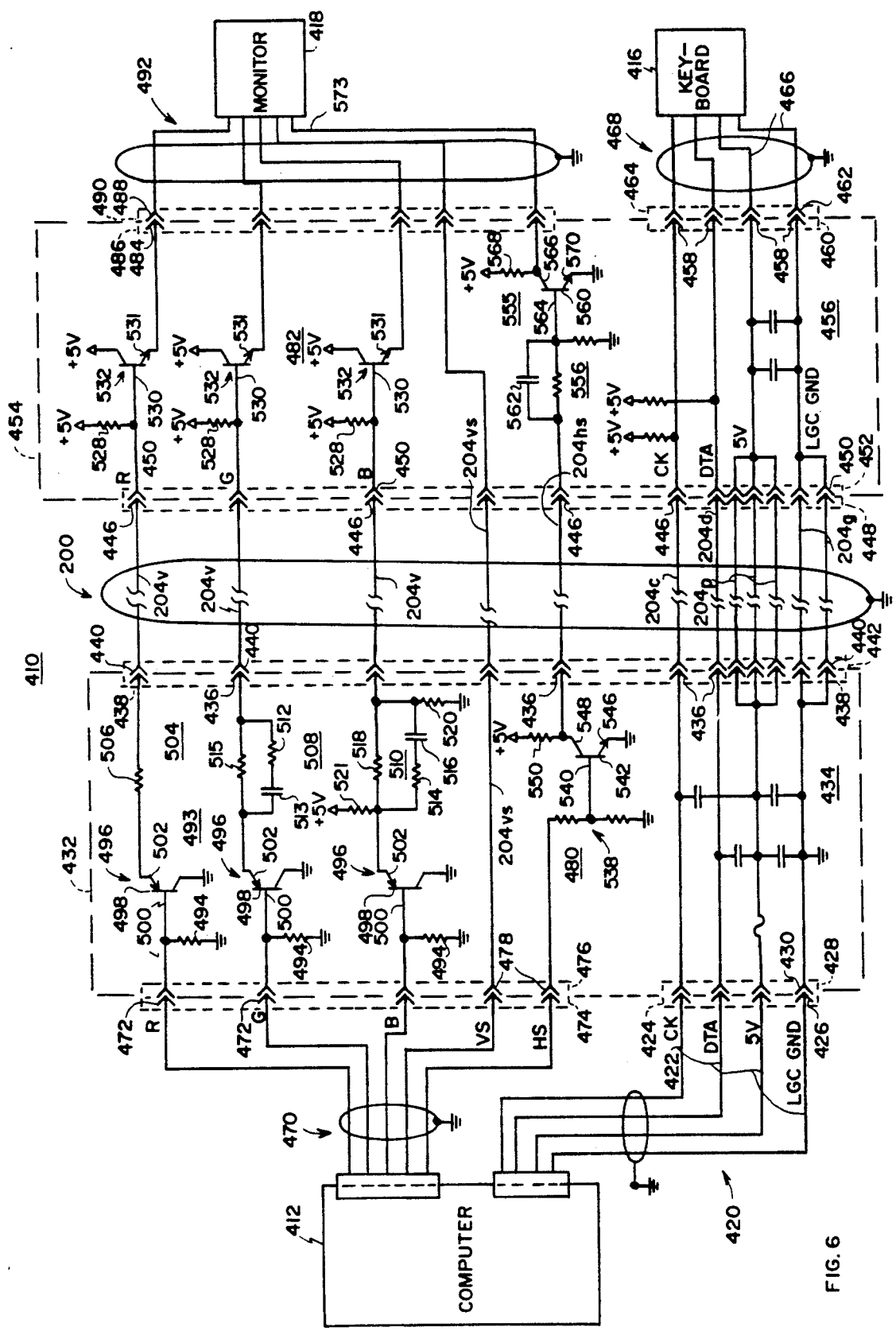
FIG. 6 is a view of yet another embodiment of this invention wherein circuitry is disclosed for conditioning analog R, G, and B and HS signals for transmission in a cable up to 300 feet in length.
Figure 7:
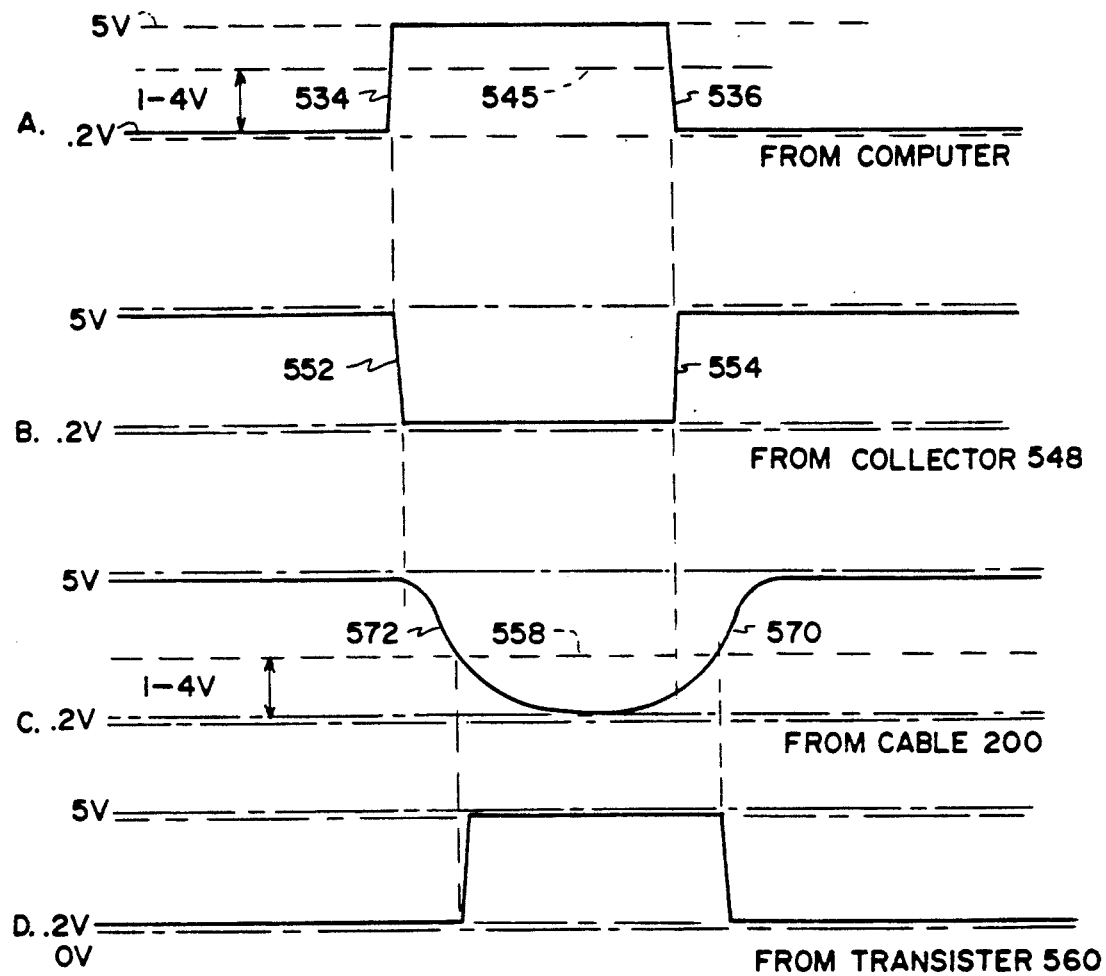
FIGS. 7a-d are waveforms of the conditioned sync signals of an embodiment described herein.

In the instance where color analog video signals and sync signals are to be provided from a computer to a color analog monitor and keyboard, FIGS. 6 and 7 illustrate an extended range cable system 410 for coupling a computer 412 any distance specified by the customer up to 300 feet via a single extension cable 200 from a keyboard 416 and analog monitor 418. As in the prior embodiments described herein, a computer keyboard cable 420 is constructed of insulated conductors 422 which convey keyboard clock, data, +5 volts, and logic ground signals from computer 412 and which terminates after a short distance with a plug 424 having terminals 426, one for each keyboard conductor. Plug 424 is inserted into a receptacle 428 having a like quantity of electrically mating terminals 430 and which is supported by an enclosure 432 (dashed lines). Enclosure 432 houses keyboard signal conditioning circuitry 434, which conditions the keyboard signals as described above and passes them via terminals 436 and keyboard output receptacle 438 to terminals 440 of plug 442 supported by extender cable 200, which terminals are coupled to conductors 204 of cable 200. Cable 200 is made up of a plurality of adjacent, insulated conductors 204 which are not twisted pairs or discretely shielded and which is much cheaper than the extended cables of the prior art utilizing differentially driven twisted pairs of discretely shielded conductors in a bulkier, more expensive cable. After passing through cable 200, the keyboard signals pass through terminals 446 of another cable plug 448 to terminals 450 of receptacle 452 supported by a second enclosure 454, which houses another keyboard signal conditioning network 456 that also functions as described above. After being conditioned the second time, the keyboard signals are passed via terminals 458 of receptacle 460 to terminals 462 of plug 464, in turn coupled to conductors 466 of keyboard cable 468, connected to keyboard 416. Keyboard clock and data conductors 204c and 204d are isolated from video conductors 204v by power and ground conductors 204p and 204g as described above and shown in FIG. 5.

In a like manner, analog video signals are provided along separate, insulated conductors 204v, 204vs, and 204hs of computer cable 470 terminals 472 of plug 474, which connects to receptacle 476 having mating terminals 478 and is supported by enclosure 432. Enclosure 432 also houses video signal conditioning circuitry 480, which conditions analog signals red (R), green (G), and blue (B) and horizontal sync (HS) signals and outputs these conditioned signals via terminals 436 of receptacle 438 to terminals 440 of plug 442 supported by extended range cable 200. Vertical sync signals are not conditioned in this embodiment. Terminals 440 of plug 442 are connected to conductors 204v, 204hs, and 204vs of cable 200. As with the keyboard conductors 204c and 204d, the video conductors 204v of cable 200 terminate with terminals 446 of plug 448 which electrically mate to terminals 450 of receptacle 452 supported by the second enclosure 454 housing the second video conditioning circuitry 482. Generally, this second video conditioning circuitry 482 reconstructs the video signals passed over the extended range cable 200, which become degraded and attenuated thereby and which also contain noise due to crosstalk induced by adjacent conductors. After being conditioned and reconstructed, the video signals are passed via terminals 484 of receptacle 486 to terminals 488 of plug 490 supported by cable 492, in turn connected to monitor 418.

As stated, the analog video signals provided by computer 412 consist of discrete red (R), green (G), and blue (B) signals which generally vary between 0-700 mv and act upon the red, green, and blue electron guns of the monitor CRT to vary beam currents thereof relative to signal amplitude. A horizontal sync pulse (HS) provides horizontal synchronization to the monitor and consists of a pulse of approximately 40-100 microseconds at a frequency of approximately 10-25 KHz. This HS pulse is either positive-going or negative-going, depending upon the mode in which the monitor is used. A vertical sync pulse (VS) provides vertical synchronization to the monitor and consists of a pulse of approximately 400 microseconds at a frequency of approximately 50-70 Hz. The exact specifications of these signals vary from manufacturer to manufacturer, with examples thereof herein being merely for convenience of illustration.

Examining first the signal conditioning circuitry 493 for the R video signal, it is seen that initially the R signal is passed across resistor 494, being in the range of 75-85 ohms, with 82 ohms being preferred, coupled between the signal line and ground. An identical resistor 494 coupled as shown and described for the R video signal is also employed for the G and B video signal lines. Resistor 494 serves as a termination resistor for the video output card (not shown) of computer 412 and is, in most cases, selected to be of approximately 10 percent higher resistance that the standard 75-ohm load normally used to terminate video signals. This reduces loading on the video output card of computer 412 which, in addition to reducing current flow it must provide, results in a signal having a slightly higher amplitude being provided to signal conditioning circuitry 493. This higher-in-amplitude signal, when applied to the following amplifier stage 496, which has slightly less than unity gain, helps offset line losses in extended cable 200. Amplifier stage 496 may be a PNP transistor 498, which is coupled in emitter-follower configuration and functions as a current gain amplifier. As with resistor 494, an identical transistor 498 is utilized in a like manner for the G and B signal lines, with like numerals designating like components. The amplitude of the video signal applied to base 500 of transistors 498 is maintained at emitters 502 (in addition to the 0.7 volt silicon drop) of transistors 498, while current flow of the signal is increased by approximately 50 times. Thus, transistors 498 modulate signal current flow through conductors 204v responsive to the R, G, and B video signals applied to bases 500 and provides the power necessary to pass the video signals over the up to 300-foot conductor 204v of extended cable 200. Next, and examining the signal path for the R video signal, it is passed through an impedance matching network 504 consisting, in one embodiment, of a 45-70 ohm resistor 506, with a 51-ohm precision resistor being preferred. It has been discovered that the characteristic impedance of conductors of the cable described herein for extended range use is between 50 and 60 ohms and that a 51-ohm series resistor 506 provides close-to-critical signal damping such that virtually no overshoot or ringing of the signal occurs. While this resistor works well enough in most cases to provide critical damping of the signal, other schemes to achieve critical damping may be desirable with some combination of computers and terminals/extender cable lengths and include an impedance matching network 508, as shown for the G signal, and yet another network 510 as shown for the B signal. Network 508 (G signal) consists of a resistor 512 of approximately 100 ohms in series with a very small capacitor 513 of approximately 100 pf, these components being in parallel with resistor 515 (approximately 100 ohms) as shown. The value of capacitor 513 is selected according to the length of extender cable 200, and for shorter cable lengths of less than approximately 50 feet, it may be left out entirely. Its maximum value, for a 300-foot cable, is approximately 100 pf, with lower value capacitors used for shorter cable lengths. This network provides slightly better damping characteristics for higher frequencies than resistor 506 by itself.

Network 510 (B signal) consists of a 100-ohm resistor 514 in series with a 470 pf capacitor 516, with these components being in parallel with a 100-ohm resistor 518 in series with the signal line. A 510-ohm resistor 520 is coupled between the signal line and ground, and a 150-ohm pull-up resistor 521 to ensure fast signal response is coupled between emitter 502 of transistor 496 and +5 volts. In this embodiment utilizing network 510, a minimum of current is always flowing through conductor 204v via resistor 520, while modulated current is drawn through the conductor by the varying B video signal applied to base 500 of transistor 498. This results in a cleaner, more powerful signal with less noise received at signal conditioning circuitry at the monitor end of cable 200.

All of these impedance matching networks provide 45-70 ohms, with 51 ohms appearing to be optimum, to cable 200 in order to tune the signal to the characteristic impedance of the conductors 204v of cable 200. Additionally, like impedance matching networks would be used for the R, G, and B signals in any particular extension system.

After being conditioned as described, video signals R, G, and B are coupled as described by extender cable 200 to the second video conditioning network 482 located proximate keyboard 416 and monitor 418. Here, a pull-up resistor 528 between 240-500 ohms, with 360 ohms being preferred, coupled to +5 volts powers the video signal to transistors 498 via conductor 204v of cable 200 and reconstructs the faster rise times which have been degraded by being attenuated by conductor 204v of cable 200. The video signals are applied to base 530 of NPN transistor 532, as shown for the R signal, which is also connected in emitter-follower configuration to again boost power of the signal prior to inputting it to analog monitor 418 via emitter 531.

The current gain amplifier stages described above for the video signals may be discrete transistors, as described, or they may be one of any of the commercially available wideband amplifiers packaged in integrated circuit form with attendant ancillary components. Additionally, the impedance matching networks described may utilize transformers to accomplish impedance matching of the video signals to conductor 204v of cable 200. In any case, it is important to note that the discrete signals are applied to discrete conductors of cable 200.

Next, the horizontal sync signal will be examined. As shown in FIG. 7a, the HS signal as output by computer 412 shown as a positive-going pulse of approximately 10 microseconds at a frequency of 10-30 KHz and has an amplitude of 3.5-5.0 volts, depending upon the manufacturer of the system. As stated, a negative-going HS pulse may also be used with the circuitry described herein. Rising and falling edges 534 and 536 of the horizontal pulse are generally very fast, being generally in the range of 150 nanoseconds, which normally would cause significant radiated noise and crosstalk in the adjacent, non-twisted pair, unshielded conductors 204v of cable 200. Applicants have overcome these problems, in addition to the shielding technique described above, by converting the HS signal to a voltage signal and allowing the conductor conveying the HS pulse to attenuate the high frequency components of the signal to a point where radiated noise and crosstalk is greatly reduced or eliminated entirely. This attenuated voltage signal is reconstructed to its original form prior to being input to the monitor.

Initially, this HS signal is applied to a voltage divider network 538 of signal conditioning network 480, after which it is passed to base 540 of a switching and inverting amplifier consisting of transistor 542, which is biased normally off. Voltage divider network 538 establishes a voltage threshold 545 (waveform 7a) of between 1-4 volts, with 2.8 being preferred, that the incoming HS pulse must rise to before providing the necessary proportional 700 mv to base 540 of transistor 542 in order to switch "on" transistor 542 to a conductive state. This threshold is adjusted by selecting values of resistors of network 538 to provide a threshold higher than any anticipated noise on the signal line from computer 412 to prevent any false triggering of transistor 542. As shown, transistor 542 is connected with its emitter 546 coupled to ground, and its collector 548 coupled via a 200 ohm pull-up resistor 550 to +5 volts. Collector 548 also provides the switched and inverted output to extension cable 200. Connected as shown, transistor 542 is biased "off" with less than 700 mv (corresponding to less than 2.8 volts applied to voltage divider network 538) applied to base 540, providing +5 volts at the output of collector 548. When the voltage input to network 538 rises above the 2.8 volt threshold 545 (FIG. 7a), voltage applied to base 540 of transistor 542 rises above 700 mv, switching transistor 542 "on," drawing current from resistor 550 through collector 548 and emitter 546 to ground. This draw the voltage at collector 548 to near zero volts, as shown by waveform 7b. When the trailing edge 536 of the HS pulse 7a passes downward through the 2.8 volt threshold 545, transistor 542 is switched "off," and collector voltage rises again to +5 volts. Thusly, the HS pulse is inverted prior to being input to cable 200. Additionally, the potentials of the HS pulse are applied to extender cable 200, allowing current flow through the cable to be kept to a minimum. This allows the capacitance of the cable to attenuate the falling and rising edges 552 and 554 of the HS pulse of 7b to that as shown in waveform 7c, reducing the attendant noise problem associated with fast rise times (RF crosstalk) transmitted over a relatively long cable with adjacent conductors.

Signal conditioning circuit 555 at the opposite end of cable 200 receives the attenuated HS signal 7c where it is applied first to a filtering and voltage dividing network 556. Voltage divider network 556 establishes a 1-4 volt threshold 558 (FIG. 7c), with 3.3 volts being preferred, the inverted HS pulse 7c must pass through before switching the following transistor 560. The generally higher 3.3-volt threshold suppresses a higher level of noise acquired by conductor 204hs of cable 200 than the 2.8-volt threshold 545. Capacitor 562, being generally in the range of 2,200 pf, allows the remaining high frequency components of the signal to be passed to base 564 of transistor 560 while blocking the slower D.C. components thereof. Transistor 560 functions as a switch and is biased normally "on" by base 564 being held above 700 mv by the +5 volt portion of waveform 7c representative of the "off" portion of the HS pulse from computer 412. Collector 566 is coupled via 100-ohm resistor 568 to +5 volts, and emitter 570 is coupled to ground. Coupled as described, an inverted, falling edge 572 of HS pulse 7c passing through the 3.3 volt threshold 558 reduces the proportional applied voltage to base 564 below 700 mv, switching transistor 560 "off," which in turn allows the collector voltage to rise to +5 volts for the duration the inverted HS pulse 7c is below the 3.3-volt threshold 558. Of course, when the rising edge 570 of inverted HS pulse 7c passes upward through the 3.3-volt threshold, transistor 560 is switched "on," shunting current through resistor 568 to ground and dropping the voltage at collector 566 near 0 volts. In this manner, the inverted HS pulse is reconstructed and fed to the HS input 573 of monitor 418.

The switching transistors described above for the HS pulse may be replaced with Schmitt triggered amplifiers, or comparators may be used equally well for the described purpose.

The vertical sync pulse (VS) is merely fed straight through the first signal conditioning network via conductor 204vs and coupled to conductor 204v of extender cable 200 to the second signal conditioning network where it is again fed therethrough via conductor 204vs to monitor 418. Thus, no signal conditioning is undertaken with the VS pulse. This is because it is a slower signal and does not create significant crosstalk when applied to conductor 204vs of cable 200 with adjacent conductors.

While certain resistors and capacitors have been stated as having specific values, it is noted that these values may be changed by as much as 20% without significantly affecting the described circuitry.

It is to be noted that in this embodiment, as with the others described herein, the signal conditioning networks may be incorporated into computer 412 and monitor 418 or keyboard 416, respectively, or a composite terminal (not shown) with the extending cable coupled to the computer and monitor or keyboard or terminal. Additionally, where a computer is provided with ports for connecting a monitor and keyboard thereto, the cables to the signal conditioning network for the computer are provided with plugs adapted to electrically interface therewith. As is also conventional, enclosure 454 is provided with appropriate connectors to interface with monitor 418, keyboard 416, or a composite terminal.

From the foregoing, it is apparent that the applicants have provided circuitry for remotely coupling a color K.D.U. a distance of up to 150 feet from the computer, the circuitry being inexpensive and easy to manufacture while providing reliability of operation. Additionally, in another embodiment of this invention, circuitry is described for coupling analog video signals to a monitor and keyboard located up to 300 feet from a computer.

After having described our invention and the manner of its use, it is apparent that incidental changes may be resorted to that fairly fall within the scope of the following appended claims.

We claim:

1. A communications link for coupling a keyboard and an analog monitor to a distantly located computer comprising:

a first signal conditioning circuitry disposed for receiving at least analog red (R), green (G), and blue (B) video signals and horizontal sync (HS) signals from a computer and providing discrete, first-conditioned R, G, B, and HS signals;

a shielded insulated cable up to approximately 300 feet in length having a plurality of discrete, insulated, closely adjacent conductors, with one of each said conductors coupled to one of each said first-conditioned signals R, G, B, and HS for conveying at least said first-conditioned signals;

a second signal conditioning circuitry coupled to the opposite end of said cable for receiving said first-conditioned signals and providing discrete second-conditioned R, G, B, and HS signals to a monitor, said second signal conditioning circuitry including a current source coupled to one of each said conductors conveying said R, G, and B signals;

said first signal conditioning circuitry comprises:
      a plurality of first discrete modulation means, one of each responsive to one of each said R, G, and B signals for modulating current flow from said current source through said conductors conveying said first-conditioned R, G, and B signals,
      a plurality of discrete impedance matching means, one of each coupled to one of each said first modulation means and to one of each said R, G, or B conductors of said cable for matching impedance of each of the R, G, and B signals to the impedance of said conductors of said cable conveying said first-conditioned R, G, and B signals;
      first switching means responsive to said HS signal and having a first powered terminal and a first grounded terminal, and further having a first voltage threshold such that when said smaller HS signal rises above said first voltage threshold, said switching means is triggered to a conductive state, coupling a current path between said first powered terminal and a first grounded terminal of said first switching means, and when said smaller HS signal falls below said threshold, said switching means is triggered to a non-conductive state, decoupling said current path between said first powered terminal and said first grounded terminal of said first switching means, for converting said HS signal to an HS voltage signal and applying said HS voltage signal to a said conductor of said cable so that impedance of said cable attenuates high-frequency components of said HS voltage signal, decreasing interfering crosstalk radiating therefrom, said second signal conditioning circuitry comprises:
      a plurality of second discrete signal modulation means coupled to one of each said conductors of said cable, and responsive to said first-conditioned R, G, and B signals for modulating said first conditioned signals R, G, and B and adapted for providing said second conditioned R, G, and B signals to a monitor,
      voltage divider and filter means responsive to said HS signal for filtering and providing a proportional, smaller, HS voltage signal, and,
      second switching means coupled to smaller HS signal and provided with a second voltage threshold such that when said smaller HS signal rises above said second threshold, said second switching means is triggered to a conductive state, coupling a current path between a second powered terminal and second grounded terminal of said second switching means, and when said smaller HS voltage signal falls below said threshold, said second switching means is triggered to a nonconductive state, decoupling said current path between said second powered terminal and said second grounded terminal of said second switching means, for converting an attenuated said first-conditioned HS voltage signal to said second-conditioned HS signal, said second switching means adapted for providing said second-conditioned HS signal to said monitor.

2. A communications link as set forth in claim 1 wherein each said load resistor coupled between each said R, G, and B signals comprises a resistor between 75 and 85 ohms.

3. A communications link as set forth in claim 1 wherein said first discrete signal modulation means each comprises a transistor biased as a current gain amplifier to continuously modulate current flow responsive to said R, G, and B signals from said computer.

4. A communications link as set forth in claim 1 wherein impedance of said cable is between 50 and 60 ohms, and each said impedance matching means is between 45 and 70 ohms, with 51 ohms being preferred.

5. A communications link as set forth in claim 1 wherein said first voltage threshold is from 1 to 4 volts.

6. A communications link as set forth in claim 5 wherein said first switching means comprises a transistor biased normally off, and when said HS signal rises above said threshold, said transistor is triggered on, establishing said current path.

7. A communications link as set forth in claim 1 wherein said discrete resistance of said second signal conditioning circuitry comprises a resistor between 240 and 500 ohms, with 360 ohms being preferred.

8. A communications link as set forth in claim 1 wherein said second signal modulation means each comprises a transistor coupled as a current-gain amplifier biased to provide continuous modulation of current responsive to said first conditioned signals R, G, and B.

9. A communications link as set forth in claim 1 wherein said voltage divider and filter means provides 700 MV to said second switching means when said HS signal is at threshold voltage level from ground.

10. A communications link as set forth in claim 9 wherein said switching means is biased normally on, and when said HS signal falls below said threshold, said switching means is triggered off.

11. A communications link for coupling a keyboard and an analog monitor to a distantly located computer comprising;

a first signal conditioning circuitry connectable to a digital computer and disposed for receiving keyboard clock and data signals, power, logic ground, chassis ground, and video signals comprising analog red (R), green (G), and blue (B) signals and horizontal sync (HS) and vertical sync (VS) signals, said first signal conditioning circuitry comprising:

a first capacitor connected between said keyboard clock signal and said power and a second capacitor connected between said keyboard data signal and said power, third and fourth capacitors coupled between said power and logic ground, and a discrete load resistor coupled between each said red, green, and blue signals and ground;

first discrete signal modulation means coupled to a signal side of each said load resistor for modulating a signal current flow responsive to said red, green, and blue signals;

discrete impedance matching means coupled to said signal current flow for matching the impedance of each of the modulated current red, green, and blue signals to the impedance of conductors of a cable;

voltage divider means coupled to said horizontal sync signal for providing a proportional, smaller horizontal sync signal;

switching means responsive to said smaller horizontal sync signal and provided with a first voltage threshold such that when said smaller horizontal sync signal rises above said threshold, said switching means is triggered to a conductive state, providing a current path between a first powered terminal and a first grounded terminal of said first switching means, and when said smaller horizontal sync signal falls below said threshold, said current path is interrupted, for providing an inverted horizontal sync signal as a voltage signal from said powered terminal to a discrete said conductor of said cable, with said conductor attenuating high frequency components of said inverted horizontal sync signal, decreasing interfering crosstalk radiating therefrom;

said cable having discrete conductors disposed for electrical connection to said keyboard signals and said video signals and said VS and HS signals, said cable being up to approximately 300 feet long; and second signal conditioning circuitry connectable to said keyboard and monitor and disposed for receiving said keyboard and said video signals and said VS and HS signals comprising:

a first resistor connected between said clock signal and positive bias voltage and a second resistor connected between said data signal and said positive bias voltage, fifth and sixth capacitors coupled between said positive bias voltage and ground, a discrete resistor coupled between each said conductor conveying said first conditioned signals red, green, and blue and power for providing said current flow to said first modulation means, and second discrete signal modulation means coupled to a signal side of each said resistor for modulating said first conditioned signals red, green, and blue and providing second conditioned red, green, and blue signals to a monitor, voltage divider and filter means coupled to said inverted horizontal sync signal for filtering and providing a proportional smaller inverted horizontal sync signal, second switching means coupled to said smaller horizontal sync signal and provided with a second voltage threshold such that when said smaller horizontal signal rises above said second threshold, said switching means is triggered to a conductive state, providing a switched current path between a second powered terminal and a second grounded terminal of said second switching means, and when said smaller horizontal signal falls below said second voltage threshold, said conductive path is interrupted, for reinverting the inverted horizontal sync signal and providing said inverted signal to said monitor from said second powered terminal.

12. A communications link as set forth in claim 10 wherein said keyboard clock and data signals are applied to adjacent first and second said conductors, and keyboard power and ground potentials are applied to other of said conductors interposed between said first and second conductors, and said conductors having said video signals applied thereto, whereby said conductors conveying said keyboard clock and data signals and said conductors conveying said video signals are shielded from one another by said interposed conductors.

* * * * *